J. HECTOR.
ANIMAL FEED TROUGH.
APPLICATION FILED AUG. 2, 1919.
1,338,077.
Patented Apr. 27, 1920.
2 SHEETS—SHEET 2.
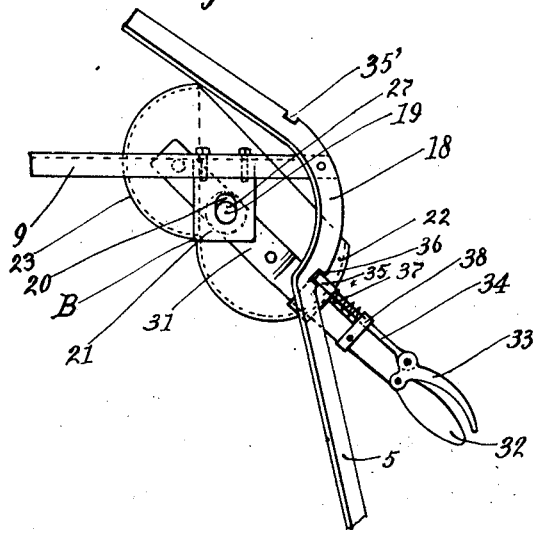
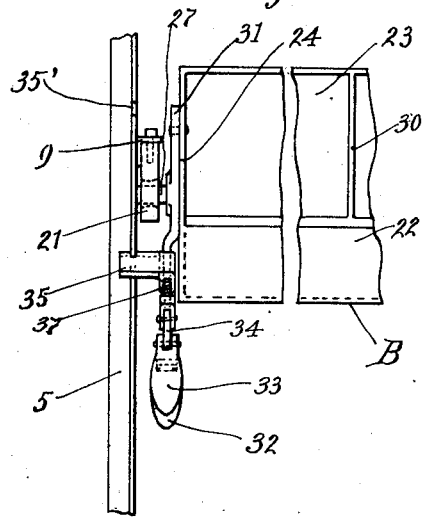
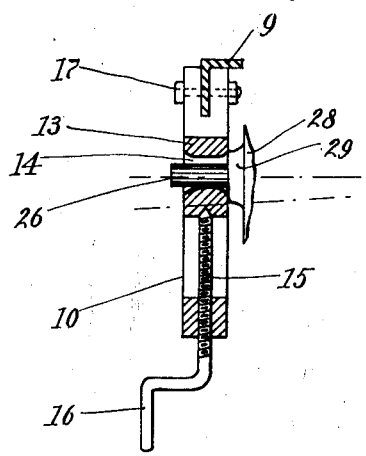
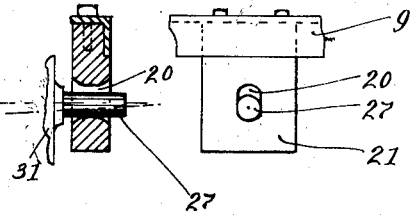
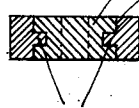
Inventor,
John Hector
by H. S. Johnson
his Attorney.

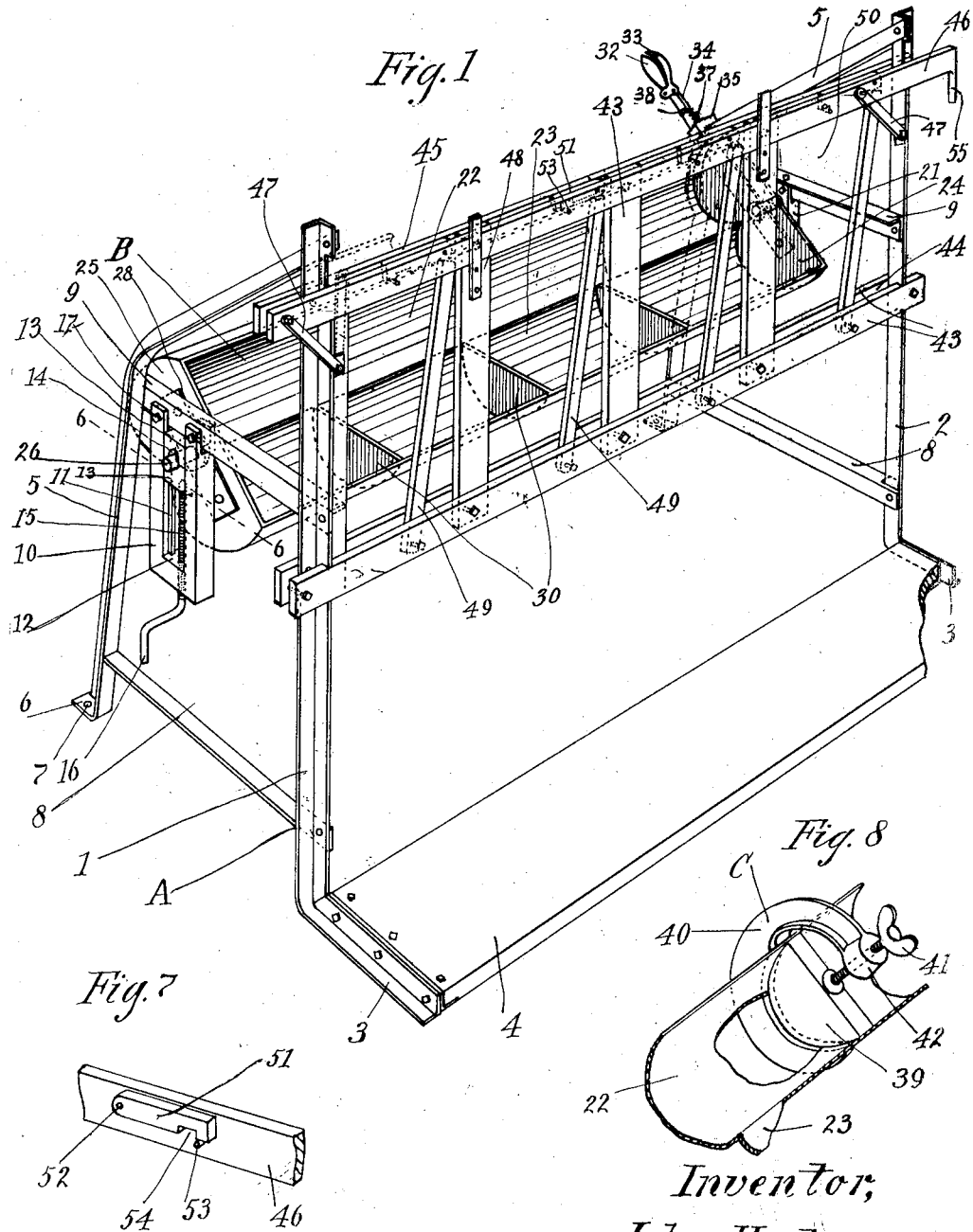

UNITED STATES PATENT OFFICE.

JOHN HECTOR, OF SAUK CENTER, MINNESOTA.

ANIMAL FEED-TROUGH.

1,338,077.  Specification of Letters Patent.  Patented Apr. 27, 1920.

Application filed August 2, 1919. Serial No. 314,854.

*To all whom it may concern:*

Be it known that I, JOHN HECTOR, a citizen of the United States, residing at Sauk Center, in the county of Stearns and State of Minnesota, have invented certain new and useful Improvements in Animal Feed-Troughs, of which the following is a specification.

This invention relates to improvements in feed troughs and more particularly to that type of devices used for feeding milk or other food to calves, wherein each animal is assigned an individual compartment.

An object of the invention is to provide a feed trough having compartments, all of which may be filled simultaneously without giving each compartment any individual attention.

A further object of the invention is to provide in a device of the class described a feed trough with stanchion mechanism and anchoring means to hold the device positioned on the ground, the latter being rendered effective by the weight of the animals.

A still further object of the invention is to provide a feed trough for dispensing liquid food to animals which will be capable of being adjusted when set on uneven ground so that the trough will assume level position.

In the drawings:

Figure 1 is a perspective view of a feed trough embodying the invention.

Fig. 2 is a fragmentary side view of same.

Fig. 3 is a front view of Fig. 2.

Fig. 4 is a fragmentary vertical view through the axis of rotation of the trough member.

Fig. 5 is an end view of one of the journals of the trough member.

Fig. 6 is a cross section on line 6—6 of Fig. 1.

Fig. 7 is a perspective view of a movable partition in one of the troughs and Fig. 8 is a fragmentary perspective view of the movable partition wall for one of the troughs.

In the drawings, A represents a frame and B a rotary double trough journaled on the frame.

The frame comprises two oppositely disposed vertical uprights 1 and 2 respectively bent at their respective lower ends to form outwardly extending foot board supports 3, the latter being connected by a horizontally disposed foot board 4 adapted to rest on the ground. Each of the uprights is rigidly secured to a rearwardly and downwardly extending leg member 5 terminating at its lower end in a plate 6 provided with a hole 7. The hole 7 serves as an additional positioning means for the frame in that it is adapted to receive a rod to be driven into the ground. Each upright and its respective leg member are joined together by cross members 8 and 9.

Rigidly secured on the cross member 9 of the upright 1 and depending therefrom is the journal block support 10, comprising a pair of oppositely disposed vertical ribs 11 located in a rectangular central opening 12, said opening slidably receiving a journal block 13 having grooves on oppositely disposed sides to loosely receive the ribs 11 so that the journal block may be slid vertically in said opening. The journal block is provided with a centrally disposed journal 14, having its horizontally disposed axis arranged perpendicular to the cross member 9. The journal is slightly elongated upwardly to form an oblong opening. The journal block support 10 is further provided with an adjustment screw 15, screw threaded in the lower wall of the opening 12, and abutting with its end against the under side of the journal block 13 so that when said screw is actuated the journal block may be raised and lowered as desired.

The adjustment screw 15 is provided with a suitable handle 16. It will be noted that the journal block support 10 is formed at its top with bifurcated ends to receive one leg of the cross member 9, said bifurcated ends and member 9 being pierced by bolts 17 whereby the journal support is firmly secured on the frame.

In the process of assembling the machine the journal block 13 may be inserted from the top into the opening 12 and the journal support then securely fastened in place. The member 5 of the upright 2 as indicated in Fig. 2 of the drawings is bent to form a curved portion 18, the curve being concentric with the center 19 of the journal 20 in the journal block 21, the latter being firmly secured to the cross member 9 of the upright 2. The axes of the journals 14 and 20 are in alinement and are equi-distant from the uprights 1 and 2.

Rotatably supported in said journals is the double trough B. The double trough consists of two comparatively long narrow troughs 22 and 23 respectively, the trough 22 being joined with one of its long edges to one of the long edges of the trough 23, the troughs being preferably integral so that the openings or cavities of the troughs are disposed at right angles to each other. The troughs are jointly closed at their respective ends by the end walls 24 and 25 respectively.

Firmly secured on each of the end walls and projecting outwardly therefrom are the trunnions 26 and 27 respectively. The trunnion 26 is formed with a base plate 28 surmounted by a boss 29 from which extends the trunnion 26 said boss serving as a side bearing for the trough B. The journals 14 and 20 have their bearing surfaces curved longitudinally as indicated in Fig. 4 so that the trunnions may roll thereon transversely during the adjustment of the trough. The trunnion 27 is formed with a base plate 31 whereby it is firmly riveted to the end wall 24 of the trough. The base plate extends outwardly beyond the outer edge of the trough 22, and is formed at its outer end with a handle 32, said handle having pivoted thereon a fulcrumed lever 33 pivotally connected with a rod 34, said rod being firmly connected to a dog 35 at its inner end. The dog extends laterally from said handle and overlaps for a distance the outer edge of the member 5 of the upright 2 and is adapted to engage either of the notches 35 or 36 respectively in the edge of the member 5. The dog 35 surrounds slidingly the shank of the handle 32 and engages an outwardly pressing spring 37 surrounding the rod 34, said spring abutting with its opposite end against a collar 38 on the handle 32 through which the rod 34 slidingly fits. Thus when the lever 33 is operated the dog is withdrawn from the notch 35 or 36 as the case may be.

It will be noted that when the trough is adjusted to various levels the relative position of the trough with respect to the uprights will constantly change thereby causing the dog 35 to slide laterally in the notch. The trough 22 is provided with a movable transverse comparatively thick partition wall 39. This partition is held positioned in the trough by means of a clamp C, said clamp consisting of a clamp member 40 extending from a point central with the opening of the trough around the bottom of the latter and conforming closely to the contour thereof.

A thumb screw 41 screw threadedly piercing the hub 42 forming part of the clamp member is adapted to engage the partition 39 whereby when said screw is caused to turn the partition 39 will be pressed against the inner surface of the trough, the latter in turn being thereby pressed against the conforming surface of the clamp member. Thus, when the partition 39 is released from pressure it may be moved laterally to any position throughout the length of the trough and secured thereat.

In operation the trough is tilted to assume the position indicated in Fig. 2 wherein the trough 22 is shown in horizontal position ready to receive a supply of milk or other food, the trough having been previously adjusted to level position. The lever 33 is then depressed and the handle 32 moved upwardly to rotate the trough on its trunnions until it assumes the position indicated in Fig. 1 of the drawings. Obviously the food stuffs will be transferred to the trough 23 by gravity, each compartment therein receiving an equal quota.

In order to control the animals so that each may be held to a particular compartment in the trough, applicant has provided stanchion mechanism removed a distance from the trough and in front of the latter. The stanchion mechanism comprises a pair of oppositely disposed horizontal bars 43 firmly secured at their respective ends to the uprights 1 and 2 and approximately at a level corresponding to that of the trough. The bars 43 are arranged one on either side of the uprights so as to form a space 44 between them. Arranged above said bars 43 and parallel therewith and also secured firmly at its respective ends to the uprights 1 and 2 is the bar 45. In spaced relation with and parallel to the bar 45 is the movable bar 46 pivotally mounted on obliquely disposed links 47, the latter being pivotally mounted at their lower ends on the uprights 1 and 2 respectively, so that when the bar 46 is caused to be moved laterally it will be lifted bodily horizontally away from the bars 43. Spaced between the uprights 1 and 2 are a plurality of standards 48 firmly secured between the bars 43 at their lower ends and to the bar 45 at their upper ends.

A swinging stanchion member 49 is pivoted at its lower end between the bars 43, and extends upwardly and is located with its pivot end in the space between the standards so as to be capable of being swung to assume an upright position to render it parallel with the standards 48. In operative position as shown in Fig. 1 the stanchion members are shown leaning against the standards 48, there being one stanchion member for each compartment in the trough 23, each stanchion member being arranged so as to bring the head of the animal when projected through the space 50 central with a compartment in the trough. In order to hold the stanchion members in upright position a latch 51 is pivotally mounted by means of pivot 52 on the inner side of the bar 46. The latch rests upon a pin 53 and is provided on its under side with a notch 54 adapted to loosely receive the upper end of the stanchion member, so that when the stanchion member is moved from its leaning position the latch will be raised until the stanchion abuts against the pin 53 when the notch will fall by gravity over the end of the stanchion.

When it is desired to release the animals the bar 46 is moved laterally by means of a handle 55 at the outer end thereof, the bar being lifted bodily as hereinbefore stated together with the latches away from the stanchion member, the latter falling by gravity back to their leaning positions. Obviously the animals will be required to step on the foot board 4 to reach the compartments in the trough whereby the device is effectively anchored to the ground by the weight of the animals.

When it is desired to use only part of the compartments the partition 39 may be moved longitudinally in the trough 22 to register with any desired partition 30 of the trough 23 so that the food material may be controlled to enter certain of the food compartments only.

I claim:

1. A feeding device, comprising a frame, a horizontally disposed double trough swingingly supported on the frame, said double trough consisting of two individual open top troughs arranged side by side and joined together the open tops of said individual troughs being at an angle to each other, partition walls in one of said individual troughs, means for swinging said double trough, and locking means for locking the latter to the frame in any one of two positions so that the opening of either of said troughs may be held in level position.

2. An animal feeding device, comprising a frame consisting in part of a comparatively high upright at the front of each end thereof said uprights being bent forwardly at their lower ends, a horizontally disposed double trough rotatably mounted on the frame, to the rear of said uprights, said double trough consisting of two open top troughs arranged contiguously side by side the open top of one trough being at an angle to the open top of the other trough, transverse partition walls in one of said troughs to divide the latter into compartments, locking means extending from the double trough to the frame for locking the former against rotation, stanchion mechanism supported on said upright for controlling the heads of the animals to hold them positioned one in front of each of said compartments and a foot board supported on said forwardly bent portions to be engaged by the front feet of the animals for the purpose set forth.

3. An animal feeding device, comprising a frame, a comparatively long horizontally disposed trough swingingly mounted on the frame, said trough consisting of two longitudinally contiguous open top cavities one of said cavities being divided into compartments arranged in a row, the openings of said compartments being at right angles to and opposite the opening of the other cavity, means extending from the trough to the frame for arbitrarily locking the trough in the frame so as to bring and hold the opening of either cavity in level position.

4. An animal feeding device, comprising a frame, a horizontally disposed trough pivotally mounted at its respective ends on the frame to swing in a vertical plane said trough consisting of two comparatively long troughs arranged side by side and having their openings approximately at right angles to each other one of said troughs having its interior divided into compartments, means extending from the frame to the double trough for arbitrarily locking the latter in the frame so as to hold the opening of either trough in level position, and adjusting means in connection with the pivotal mounting of said double trough for changing the pivotal relation of the latter to the frame.

5. An animal feeding device, comprising a frame, a horizontally disposed trough having spaced transverse partition walls rotatably mounted at its respective ends on said frame, an auxiliary trough adjacent to said first named trough and joined to the latter to rotate therewith and having its opening at an angle to the opening of said first named trough, locking means extending from the frame to the troughs for holding either of said troughs in level position, and a foot board on the frame and extending outwardly therefrom adjacent the ground in front of said first named trough for the purpose set forth.

6. An animal feeding device, comprising a frame, a horizontally disposed trough having spaced transverse partition walls rotatably mounted at its respective ends on the frame, an auxiliary trough parallel with and adjacent to said first named trough and joined to the latter to rotate therewith and having its opening at an angle to the opening of said first named trough, locking means extending from the frame to said troughs for separately locking either of said troughs so that their respective openings will assume a level position, and a longitudinally movable partition wall in said auxiliary trough for the purpose set forth.

7. An animal feeding device, comprising a frame, a horizontally disposed double trough rotatably mounted on the frame, said double trough consisting of two open top troughs arranged contiguously side by side the open top of one trough being at an angle to the open top of the other trough, transverse partition walls in one of said troughs to divide the latter into compartments, locking means extending from the double trough to the frame for locking the former against rotation, stanchion mechanism having openings to receive the heads of the animals on the frame and arranged in front of said divided trough and on a level therewith for controlling the heads of the animals to hold them positioned one in front of each of said compartments, and a movable partition in the undivided trough adapted to be moved longitudinally therein and to be held positioned thereon opposite any of said stanchion openings for the purpose set forth.

In testimony whereof I affix my signature in presence of a witness.

JOHN HECTOR.

Witness:
   GEORGE VOELKER.